US009116593B2

(12) United States Patent
Mercer

(10) Patent No.: US 9,116,593 B2
(45) Date of Patent: Aug. 25, 2015

(54) SINGLE-AXIS WINDOW MANAGER

(75) Inventor: Paul Mercer, Palo Alto, CA (US)

(73) Assignee: QUALCOMM Incorporated, San Diego, CA (US)

( * ) Notice: Subject to any disclaimer, the term of this patent is extended or adjusted under 35 U.S.C. 154(b) by 894 days.

(21) Appl. No.: 11/774,148

(22) Filed: Jul. 6, 2007

(65) Prior Publication Data

US 2009/0013282 A1    Jan. 8, 2009

(51) Int. Cl.
G06F 3/048 (2013.01)
G06F 3/0481 (2013.01)

(52) U.S. Cl.
CPC .... *G06F 3/0481* (2013.01); *G06F 2203/04803* (2013.01)

(58) Field of Classification Search
CPC .................. G06F 3/0481; G06F 2203/04803; G09G 2340/12
USPC ......... 715/764, 781, 784, 788, 792, 794, 802, 715/864
See application file for complete search history.

(56) References Cited

U.S. PATENT DOCUMENTS

| 5,390,330 | A | | 2/1995 | Talati |
| 5,847,706 | A | * | 12/1998 | Kingsley ...................... 715/788 |
| 6,002,400 | A | * | 12/1999 | Loring et al. ................. 715/794 |
| 6,341,174 | B1 | | 1/2002 | Callahan et al. |
| 6,606,525 | B1 | | 8/2003 | Muthuswamy et al. |
| 6,647,410 | B1 | | 11/2003 | Scimone et al. |
| 7,003,327 | B1 | | 2/2006 | Payne et al. |
| 7,194,516 | B2 | | 3/2007 | Giacobbe et al. |
| 7,480,872 | B1 | * | 1/2009 | Ubillos ......................... 715/838 |
| 7,483,955 | B2 | | 1/2009 | Gupta et al. |
| 7,587,684 | B2 | * | 9/2009 | Perttula ........................ 715/838 |
| 7,595,810 | B2 | * | 9/2009 | Louch ........................... 345/629 |
| 7,657,842 | B2 | * | 2/2010 | Matthews et al. ............. 715/788 |
| 7,739,604 | B1 | * | 6/2010 | Lyons et al. .................. 715/736 |
| 8,064,886 | B2 | | 11/2011 | Hawkins et al. |
| 8,120,625 | B2 | | 2/2012 | Hinckley |

(Continued)

FOREIGN PATENT DOCUMENTS

| CN | 1783083 A | 6/2006 |
| CN | 1902675 A | 1/2007 |
| EP | 1 667 013 A2 | 6/2006 |

OTHER PUBLICATIONS

PCT International Search Report and Written Opinion, PCT/US08/68827, Oct. 7, 2008, 8 pages.

(Continued)

*Primary Examiner* — Rashawn Tillery
(74) *Attorney, Agent, or Firm* — Norton Rose Fulbright US LLP

(57) ABSTRACT

A system and a method are disclosed for implementing a single-axis window manager on a mobile computing device to view and access multiple applications in a limited display area utilizing limited input capabilities. The mobile computing device initializes a virtual display space having a first dimension with a fixed size. For example, the virtual display space is initialized to have a horizontal dimension equal to the horizontal dimension of the display screen. At least one window is generated having a fixed size in the first dimension but also sizeable in a second direction. For example, the at least one window has a fixed horizontal dimension but is vertically sizeable. The at least one window is then inserted into the virtual display space and displayed on a display device.

26 Claims, 11 Drawing Sheets

(56) References Cited

U.S. PATENT DOCUMENTS

| | | |
|---|---|---|
| 8,135,796 B1 | 3/2012 | Slaughter et al. |
| 8,244,279 B2 | 8/2012 | Dicke et al. |
| 8,266,187 B2 | 9/2012 | Mercer et al. |
| 2002/0147777 A1 | 10/2002 | Hackbarth et al. |
| 2004/0025112 A1 | 2/2004 | Chasen et al. |
| 2004/0088362 A1 | 5/2004 | Curbow et al. |
| 2004/0261038 A1* | 12/2004 | Ording et al. .......... 715/792 |
| 2005/0091608 A1 | 4/2005 | Gusmorino et al. |
| 2006/0004911 A1 | 1/2006 | Becker et al. |
| 2006/0041460 A1 | 2/2006 | Aaron |
| 2006/0095976 A1 | 5/2006 | Torres et al. |
| 2006/0107231 A1* | 5/2006 | Matthews et al. ....... 715/788 |
| 2006/0224992 A1* | 10/2006 | Rossi et al. ............ 715/781 |
| 2006/0229063 A1 | 10/2006 | Koch |
| 2007/0043687 A1 | 2/2007 | Bodart et al. |
| 2007/0168060 A1 | 7/2007 | Nixon et al. |
| 2007/0293207 A1 | 12/2007 | Guedalia et al. |
| 2008/0005692 A1* | 1/2008 | Hoblit .................... 715/781 |
| 2008/0028315 A1 | 1/2008 | Kaplan |
| 2008/0140498 A1 | 6/2008 | Setty et al. |
| 2008/0141162 A1 | 6/2008 | Bockus |
| 2008/0221909 A1 | 9/2008 | Muhonen et al. |
| 2008/0282179 A1 | 11/2008 | Kim et al. |
| 2009/0210394 A1 | 8/2009 | Saravanan et al. |
| 2012/0096401 A1 | 4/2012 | Mercer et al. |
| 2013/0031073 A1 | 1/2013 | Mercer |

OTHER PUBLICATIONS

PCT International Search Report and Written Opinion, PCT Application No. PCT/US2009/032714, Sep. 1, 2009, 10 pages.
Chinese Office Action, Patent Application No. CN200880104215.0, Date of Issue: Mar. 5, 2013, pp. 1-8, English Translation: pp. 1-14.
Extended European Search Report, European Application No. 087811964, Date: Apr. 2, 2013, pp. 1-7.

\* cited by examiner

SINGLE-AXIS WINDOW MANAGER

BACKGROUND

1. Field of Art

The disclosure generally relates to the field of mobile computing, in particular to window and application management on a mobile computing device.

2. Description of the Related Art

Mobile computing devices are becoming increasingly more powerful and functional devices. Many mobile devices are multifunction devices with multiple device roles, such as personal digital assistant (PDA), smart phone, cellular phone, portable media player, voice recorder, video recorder, global positioning system (GPS), camera and electronic file storage. This increased functionality has resulted in users of mobile devices increasing the number of applications to interact with, often in rapid succession. However, to access and navigate these applications, conventional mobile devices visually present only a single application at a time to users. Moreover, toggling between applications requires an application to be removed from the screen and replaced with a new application covering the screen. To further navigate each application, conventional mobile devices use menus occupying the entire mobile device display area.

Mobile devices use specialized applications to provide different functions, so increases in functionality have increased the number of applications used by the mobile devices. However, the compact size of most mobile devices limits the screen-size available to display various applications. Further, as most conventional mobile devices use the entire display area to display a single application, multiple inputs are required to regularly toggle between applications in order to interact with specific applications. Often, the currently running window must be terminated to access another application. These conventional mobile devices do not allow multiple applications to be displayed on the display area, so a user cannot readily toggle between applications. Additionally, mobile devices generally have limited mechanisms for some types of inputs, such as direct manipulation pointing abilities. The combination of these limited input sources and small display size makes implementing existing two-dimensional window management methods on mobile computing devices impractical.

From the above, there is a lack of a system or method for quickly navigating between applications and simultaneously viewing multiple applications on a mobile computing device having a limited-size display area.

SUMMARY

Using various embodiments disclosed herein, a mobile computing device, for example a hand-held computing device, uses an operating system method to display and manipulate one or more applications along a single axis of a screen of the device. This constrains, yet also simplifies and enhances, mobile computing device operation by allowing multiple applications to be viewed and accessed through separate windows. As the windows can be resized or moved along a single axis, for example, a vertical axis, multiple applications can be viewed or toggled with minimal input. Because of the top-down data flow of most applications and types of content, resizing and moving windows along the vertical axis allows resizing of windows without impairing application or content display.

In one embodiment, the mobile computing device initializes a virtual display space having a first dimension with a fixed size. For example, the virtual display space is initialized to have a horizontal dimension equal to the horizontal dimension of the device screen. At least one window is generated having a fixed size in the first dimension but also sizeable in a second direction. For example, at least one window has a fixed horizontal dimension but is vertically sizeable. The at least one window is then inserted into the virtual display space and may be displayed on the device screen from the virtual display space.

In an embodiment, input is received from a user to manipulate a window along a single axis of the device screen. For example, the received input resizes the window along the second direction or moves the window along the second direction. The received input can also cause a different window from within the virtual display space to be displayed on the device screen, allowing the user to scroll through and view the windows included in the virtual display space.

In one embodiment, one or more regions of the device screen are associated with one or more system applications, such as applications using system functions or user-defined applications. The area of the device screen not associated with the one or more system applications is then used to display other applications. Hence, the system applications are displayed in the same screen region to facilitate user access, while also allowing user access to additional applications.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the disclosed subject matter.

BRIEF DESCRIPTION OF DRAWINGS

The disclosed embodiments have other advantages and features which will be more readily apparent from the detailed description, the appended claims, and the accompanying drawings, in which:

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of the claimed invention.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Example Mobile Computing Device

Figure 1:
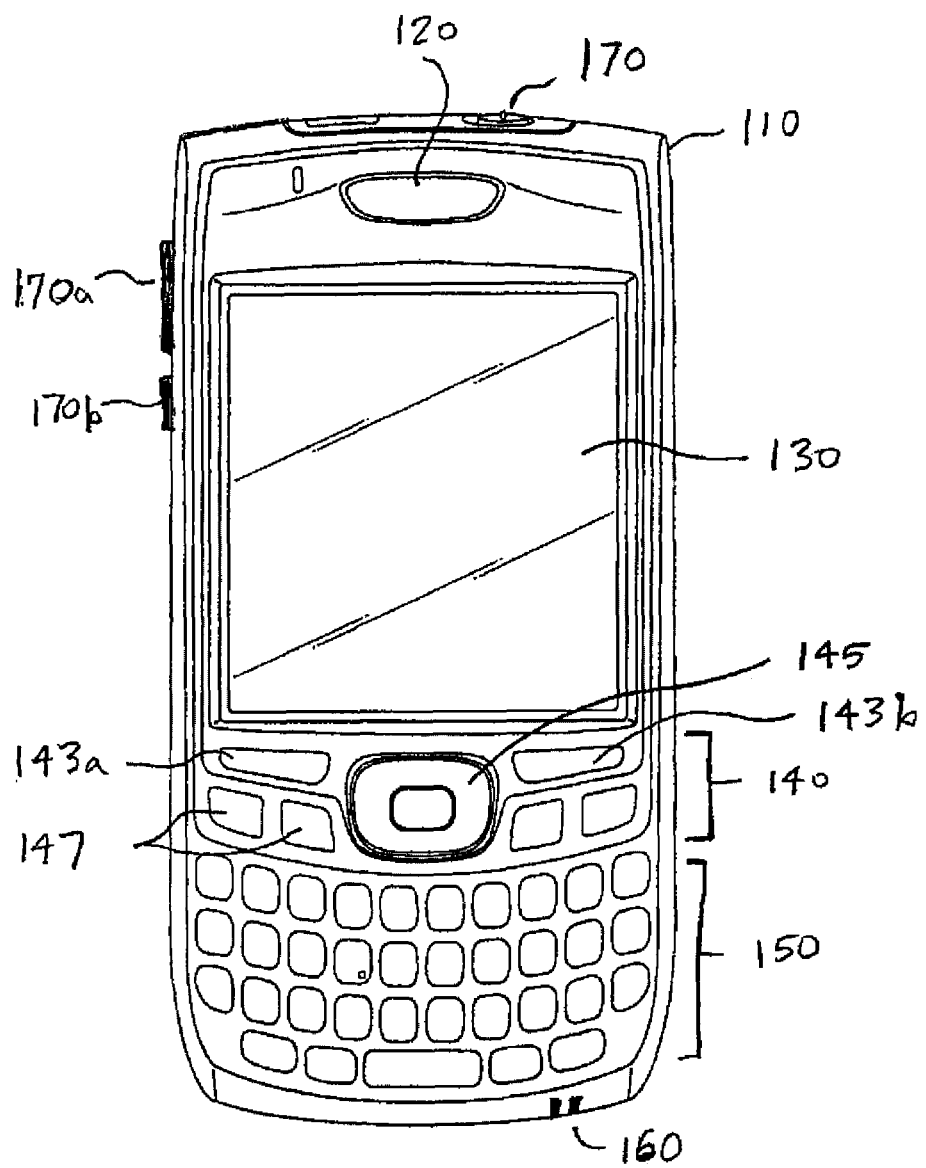
FIG. 1 illustrates one embodiment of a mobile computing device.

FIG. 1 illustrates one embodiment of a mobile computing device 110 with telephonic functionality, e.g., a mobile phone or a smartphone. The mobile computing device is configured to host and execute a phone application for placing and receiving telephone calls. It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) or data networks having voice over internet protocol (VoIP) functionality. Moreover, the principles disclosed herein may also be applied to other devices, such as personal digital assistants (PDAs), media players and other similar devices.

The mobile computing device 110 is configured to be of a form factor that is convenient to hold in a user's hand, for example, a personal digital assistant (PDA) or a smart phone form factor. For example, in one embodiment the mobile computing device 110 can have dimensions ranging from 7.5 to 15.5 centimeters in length, 5 to 12.75 centimeters in width, 0.64 to 2.2 centimeters in height and weigh between 55 and 230 grams.

The mobile computing device 110 includes a speaker 120, a screen 130, a navigation area 140 and a microphone 160. The mobile computing device 110 also may include one or more switches 170, 170a, 170b (generally 170). The one or more switches 170 may be buttons, sliders, or rocker switches and can be mechanical or solid state (e.g., touch sensitive solid state switch). In one embodiment, the mobile computing device 110 also includes an optional keypad area 150.

The screen 130 of the mobile computing device 110 is, for example, a 240×240, a 320×320, or a 320×480 transflective display. For example, the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive), electrically sensitive (capacitive), acoustically sensitive (SAW or surface acoustic wave), photo-sensitive (infrared)) including a digitizer for receiving input data, commands or information from a user. The user may use a stylus, a finger or another suitable input device for data entry, such as selecting from a menu or entering text data.

The navigation area 140 is configured to control functions of an application executing in the mobile computing device 110 and visible through the screen 130. For example, the navigation area includes an x-way (x is e.g., 5) navigation ring (or joystick) 145 that provides cursor control, selection, and similar functionality. In addition, the navigation area 140 may include selection buttons 143a, 143b to select functions viewed just above the buttons on the screen 130. In addition, the navigation area 140 also may include dedicated function buttons 147 for functions such as, for example, a calendar, a web browser, an e-mail client or a home screen. In this example, the navigation ring 145 may be implemented through mechanical, solid state switches, dials, or a combination thereof. The keypad area 150 may be a numeric keypad (e.g., a dial pad) or a numeric keypad integrated with an alpha or alphanumeric keypad 160 (e.g., a keyboard with consecutive keys of QWERTY, AZERTY, or other equivalent set of keys on a keyboard or a Dvorak keyboard). In one embodiment the keypad area 150 is displayed on the screen and receives input from a touch-sensitive screen 130.

Although not illustrated, it is noted that the mobile computing device 110 also may include an expansion slot 125. The expansion slot 125 is configured to receive and support expansion cards (or media cards), which may include memory cards such as CompactFlash™ cards, SD cards, XD cards, Memory Sticks™, MultiMediaCard™, SDIO, and the like.

Example Mobile Computing Device Architectural Overview

Figure 2:
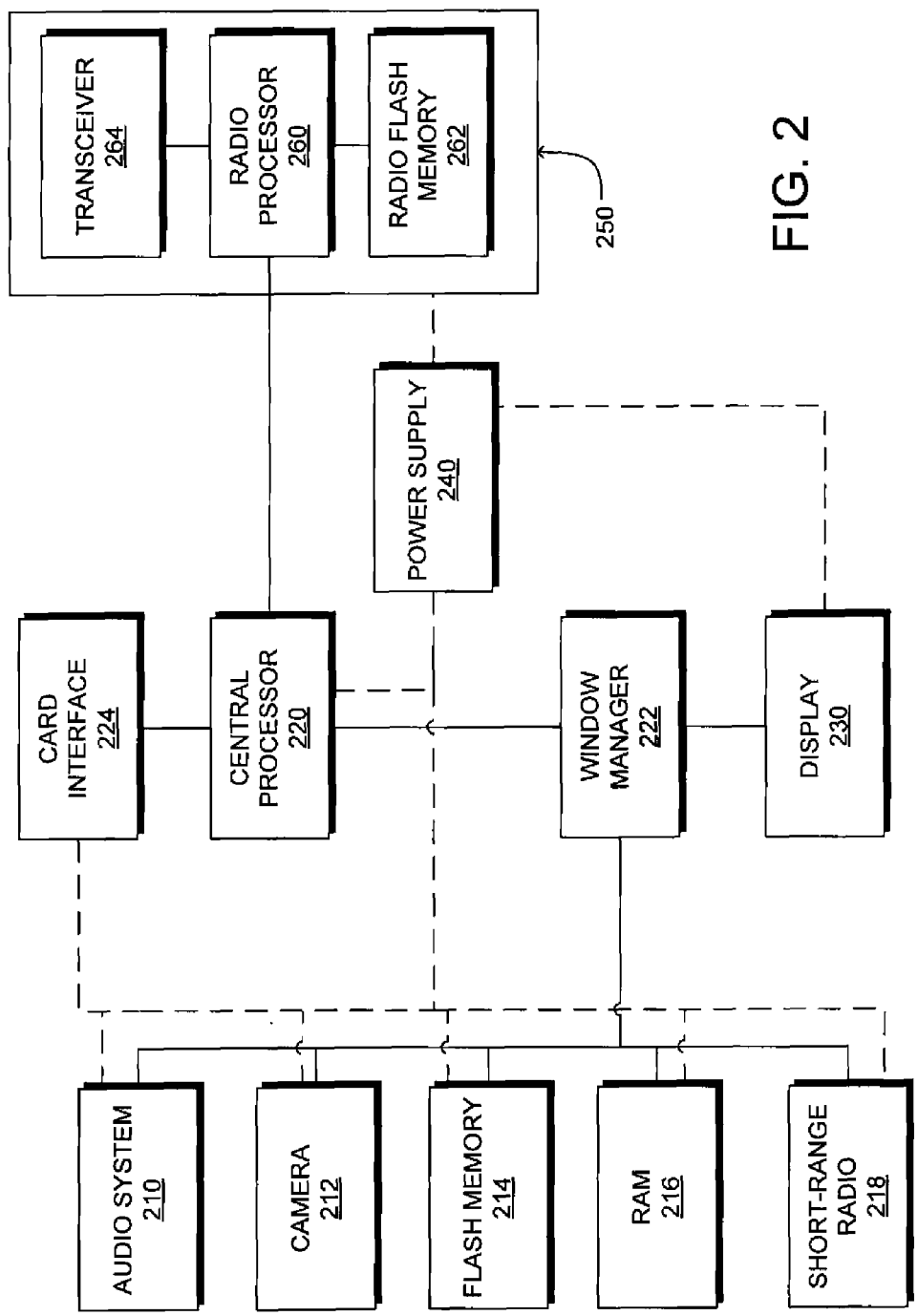
FIG. 2 illustrates one embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIG. 1. The mobile computing device 110 includes a central processor 220, a power supply 240, and a radio subsystem 250. The central processor 220 communicates with: audio system 210, camera 212, flash memory 214, RAM memory 216, short range radio module 218 (e.g., Bluetooth, Wireless Fidelity (WiFi) component), and a window manager 222. The power supply 240 powers the central processor 220, the radio subsystem 250 and a display driver 230 (which may be contact- or inductive-sensitive). The power supply 240 may correspond to a battery pack (e.g., rechargeable) or a powerline connection or component.

In one embodiment, the window manager 222 comprises a software or firmware instructions for processes that initialize a virtual display space stored in the RAM 216 and/or the flash memory 214. The virtual display space includes one or more applications currently being executed by a user and the current status of the executed applications. The window manager 222 receives requests, from user input or from software or firmware processes, to show a window and determines the initial position of the requested window. Additionally, the window manager 222 receives commands or instructions to display and modify a window, such as resizing the window along one axis, moving the window along one axis or any other command altering the appearance or position of the window, and modifies the window accordingly.

In one embodiment, the window manager 222 also monitors and controls the physical location of data displayed on the screen 130 and which data is displayed on the screen 130. The window manager 222 alters or updates the location of data on the screen 130 responsive to input from the central processor 220, to modify the screen 130 appearance. In one embodiment, the window manager 222 also monitors and controls screen brightness and transmits control signals to the central processor 220 to modify screen brightness and power usage to the screen 130.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, multiple Access (CDMA system), and a Universal Mobile Telecommunications System (UMTS). Examples of data networks include General Packet Radio Service (GPRS), third-generation (3G) mobile, High Speed Download Packet Access (HSDPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using a serial line 278.

The card interface 224 is adapted to communicate with the expansion slot expansion slot 125. The card interface 224 transmits data and/or instructions between the central processor and an expansion card or media card included in the expansion slot 125. The card interface 224 also transmits control signals from the central processor 220 to the expansion slot 125 to configure an expansion card or media card included in the expansion slot 125.

In one embodiment, central processor 220 executes logic (by way of programming, code, instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

System Operation

Figure 3:
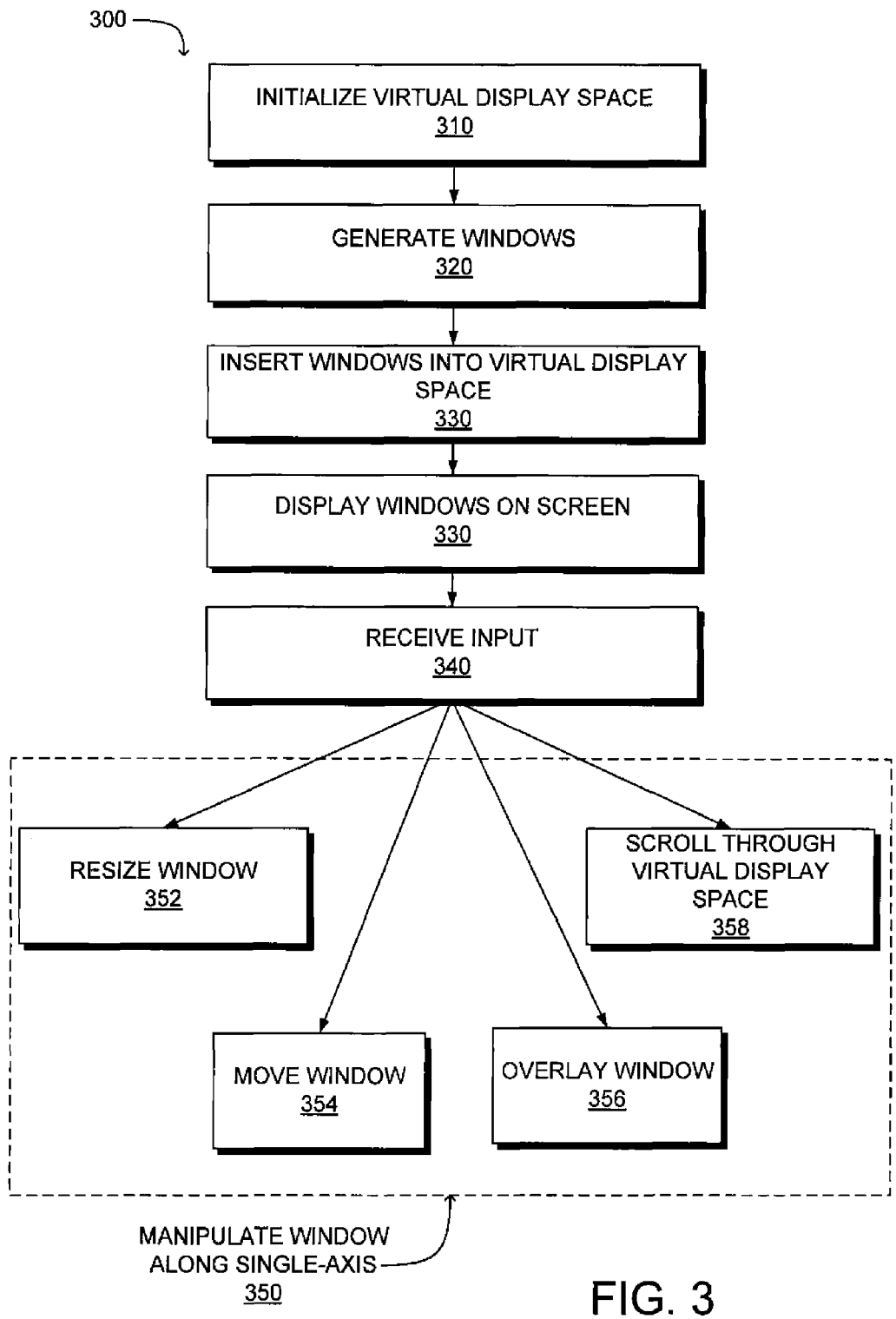
FIG. 3 illustrates one embodiment of a method for implementing a single-axis window manager, for example, in a mobile computing device.

FIG. 3 illustrates a flow chart of one embodiment of a method 300 for implementing a single-axis window manager. In an embodiment, the steps of the method 300 are implemented by the processor 220 executing software instructions that cause the described actions. Those of skill in the art will recognize that one or more of the method steps may be implemented in embodiments of hardware and/or software or combinations thereof. For example, instructions for performing the described actions are embodied or stored within a computer readable medium, e.g., flash memory 214 or RAM 216, and are executable by a processor, such as central processor 220. Furthermore, those of skill in the art will recognize that other embodiments can perform the steps of FIG. 3 in different orders. Moreover, other embodiments can include different and/or additional steps than the ones described here.

Initially, the virtual display space is initialized 310. In one embodiment, initialization establishes default parameters for window appearance, such as color, window size, resolution, placement or other similar parameters. During this process, the system takes into consideration the screen size and dimensions and can determine which axis will be fixed and which axis may be varied or transcended with respect to subsequent windows that are launched or displayed. In one embodiment, these initialization parameters may be predetermined and stored in long-term memory, such as flash memory 214. In addition, during initialization, a portion of the RAM memory 216 and/or the flash memory 214 may be created and set aside for use as the virtual display space to store windows associated with active applications as those applications are launched. In one embodiment, initialization places windows associated with one or more default applications into the virtual display space or places windows into the virtual display space corresponding to a prior user window configuration. The virtual display space describes a region with a fixed size in a first dimension and an indefinite size in a second dimension. For example, the virtual display space has a horizontal size equal to the horizontal dimension of the screen 130 and a variable vertical length exceeding the vertical dimension of the screen 130.

Windows associated with different applications can be generated 320. In an embodiment, windows are generated 320 responsive to user input, such as a request to launch an application or through automated processes such as applications launched as a part of a start or boot sequence. The windows may be generated 320 by one or more software or firmware processes running on the processor 220. The generated 320 windows have a fixed size in a first dimension, but are sizeable in a second dimension as may be set through the initialization process. For example, a window has a horizontal size equal to the horizontal dimension of the screen 130, but can be resized vertically. In one embodiment, vertically resizing windows allows for modification of applications with minimal distortion of application content. For example, vertically resizing a text editor application minimally affects the flow of the text data, and the text data is still understandable even if partially obscured by the window resizing. The generated windows are then inserted 330 into the virtual display space. In one embodiment, inserting 330 the generated windows into the virtual display space comprises associating a portion of the virtual display space with the generated windows.

One or more of the windows are then displayed 330 on the mobile computing device screen 130, allowing user viewing of applications associated with the displayed windows. In one embodiment, windows are initially displayed 330 on the screen 130 and can be moved to a location in the virtual display space not visible on the screen 130 responsive to input from a user or a software or firmware process. This stacking of application windows in the virtual display space allows for rapid and easy access to applications that may presently not fit within the viewable screen or for which the user need not presently interact, but may soon interact. Alternatively, one or more of the generated windows are selected to display 330 on the screen 130 by a user or a software or firmware process.

Input is then received 340 and used to manipulate 350 a window. In various embodiments, the input is received 340 from a user through the selection buttons 143, the keypad area 150, the screen 130, the microphone 160 or any other suitable component, or received from a software or firmware process running on the processor 220. Responsive to different inputs, the window and/or virtual display space is differently manipulated 350. For purposes of illustration, FIG. 3 provides examples of different types of window manipulation, such as resizing 352 a window, moving 354 a window, overlaying 356 a window or scrolling 358 through the virtual display space. In one embodiment, overlaying 356 a window causes one window to partially, or fully, obstruct a second window. This allows layering of windows, where one window appears to be displayed over top of another window. Scrolling 358 through the virtual display space allows a user or process to change the windows displayed 330 on the screen. As the virtual display space extends indefinitely along one axis, it includes windows not currently displayed 330 on the screen 130, so scrolling 358 through the virtual display space causes display 330 of windows in the virtual display space not currently on the screen 130.

The types of window manipulation illustrated in FIG. 3 are merely examples, and any other suitable operation can be executed to manipulate 350 one or more of the generated windows. In addition, it is noted that manipulation of the windows as described herein may be accomplished through on-screen manipulation of a touch-screen (or touch-screen device configurations), through navigation mechanisms on the device (e.g., 5-way navigation 145, navigation buttons 143), through keypad 150 or through another suitable input technique. For example, a user enters key- or button-sequences or selects on-screen icons or menus to manipulate the windows.

Example Applications

Figure 4:
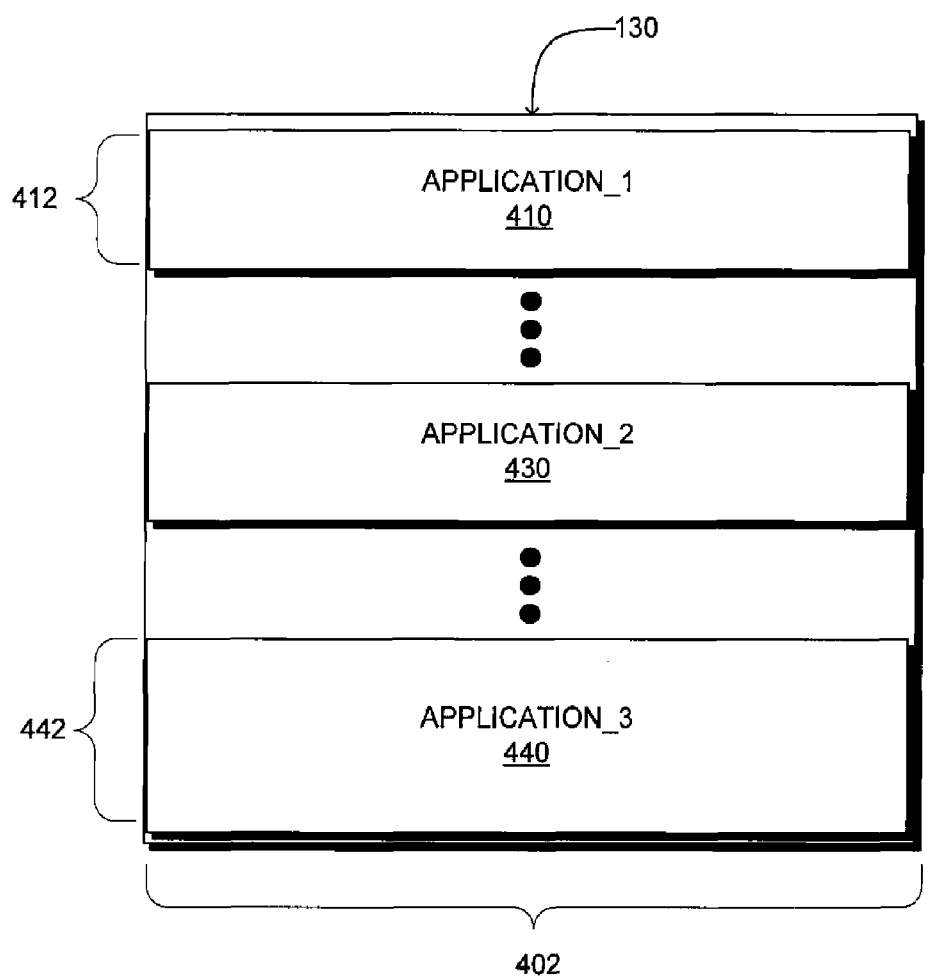
FIG. 4 illustrates one embodiment of a single-axis window manager rendered on a screen of a mobile computing device.

FIGS. 4 through 9B illustrate examples of application window ("window") behavior through the principles disclosed herein. FIG. 4 illustrates one embodiment of a single-axis window manager rendered on a mobile computing device screen 130. For purposes of illustration, FIG. 4 shows three windows, 410, 430, 440, corresponding to different applications, displayed on the screen 130. However, this is merely an example and in other embodiments, more or fewer windows are displayed.

Each window 410, 430, 440 has a fixed-size in a first direction 402. In one embodiment, this first direction 402 is a horizontal direction so each window 410, 430, 440 has a horizontal dimension substantially equal to the horizontal width of screen 130. However, the windows 410, 430, 440 are sizeable in a second direction, so different windows 410, 430, 440 can have different dimensions in the second direction. In one embodiment, this second direction is a vertical direction, so windows 410, 430, 440 can have different vertical sizes. Hence, in FIG. 4, window 410 has a first dimension 412 in the second direction (e.g., vertical direction) while window 440 has a second dimension 442 in the second direction.

In one embodiment, upon generation, each window 410, 430, 440 is initially sized to maximize the number of windows 410, 430, 440 displayed on the screen 130. In one embodiment, as additional windows are displayed on the screen 130, existing windows are resized to remain visible on the screen 130. Alternatively, one or more windows 410, 430, 440 are resized responsive to user input, allowing user customization of each window 410, 430, 440 size. In another embodiment, if a window 410 is sized to substantially fully occupy screen 130 and another window 430 is sized to occupy the full screen 130, window 410 and other windows are resized to a smaller size, allowing window 430 to fully occupy screen 130. For example, when a new application is launched, windows 410, 430, 440, initially displayed on the screen 130, are resized in the second dimension (e.g., vertically resized) so that windows 410, 430, 440 remain on screen 130 in addition to the new window. This resizing is further described below in conjunction with FIGS. 5A and 5B. In addition, in one embodiment it is noted that each window configuration may be referenced as a particular state, for example, a full screen state, a minimized state, and a maximized state.

Figure 5:
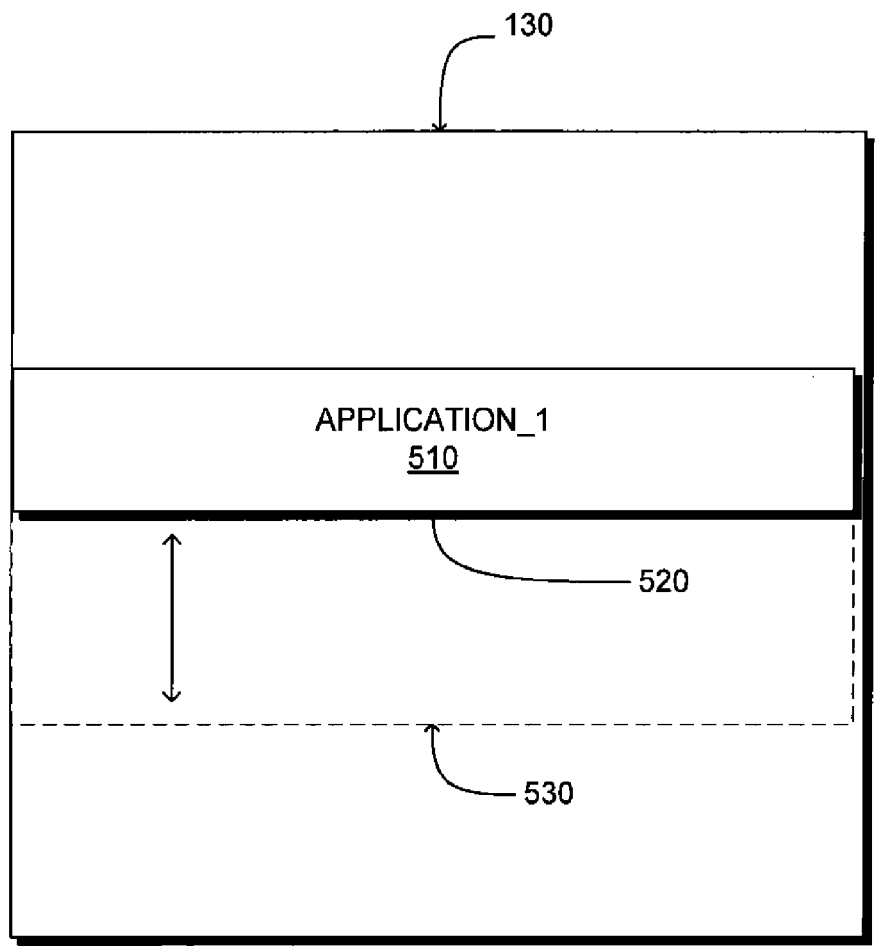
FIGS. 5A and 5B illustrate embodiments of window resizing using a single-axis window manager.
Figure 5B:
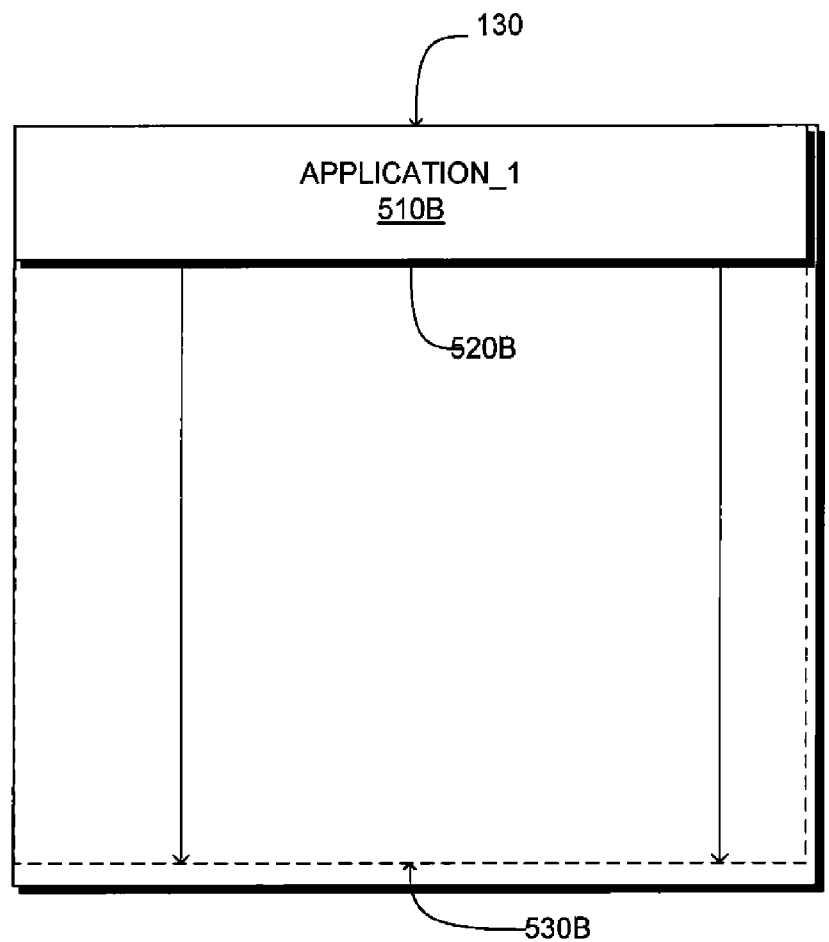

FIGS. 5A and 5B illustrate embodiments of window resizing using a single-axis window manager. For purposes of illustration, FIGS. 5A and 5B show a single window 510 displayed on screen 130. However, in other embodiments, multiple windows are displayed on screen 130.

Initially, window 510 occupies a specified amount of the screen 130, indicated by position 520. Responsive to receiving a resize command, window 510 is reconfigured to occupy a different amount of the screen 130, indicated by position 530. In one embodiment, user selection of an on-screen icon or menu causes resizing of window 510. Alternatively, user input from the keypad 150 and/or the navigation area 140 causes resizing of window 510. For example, a different area of the virtual display space is associated with window 510 to alter the window size. Hence, the resize command modifies the window 510 in the first direction from position 520 to position 530, but does not affect window size in the second direction. For example, the vertical dimension of window 510 is changed from position 520 to position 530, but the horizontal dimension of window 510 is unchanged and continues to occupy the horizontal width of the screen 130. Thus, resizing modifies a single dimension, such as the vertical dimension, of window 510 to occupy a larger fraction of the screen 130 but does not modify the second dimension, such as the horizontal dimension, of window 510. Similarly, window 510 can be resized from position 530 to position 520 to occupy a smaller fraction of the screen 130.

Similarly, FIG. 5B illustrates window resizing so that window 510B fully occupies the screen 130. Initially, window 510B occupies an amount of the screen 130 indicated by position 520B. Responsive to a resize command, window 510B is resized in the second dimension (e.g., the vertical dimension) to fully, or substantially fully, occupy the screen 130 in the second direction. For purposes of illustration, position 530B illustrates window 510B fully occupying screen 130. In one embodiment, receipt of a particular type of resize command, such as a maximize command or full-size command, automatically resizes window 510B to position 530B, which fully occupies screen 130.

As shown in FIGS. 5A and 5B, a window 510 can be resized to increase or decrease the fraction of the screen 130 occupied by the window 510. This allows the application associated with the resized window 510 to be more or less visible. Hence, the different windows can be resized in the second dimension to occupy different fractions (or vertical portions) of the screen 130.

Figure 6:
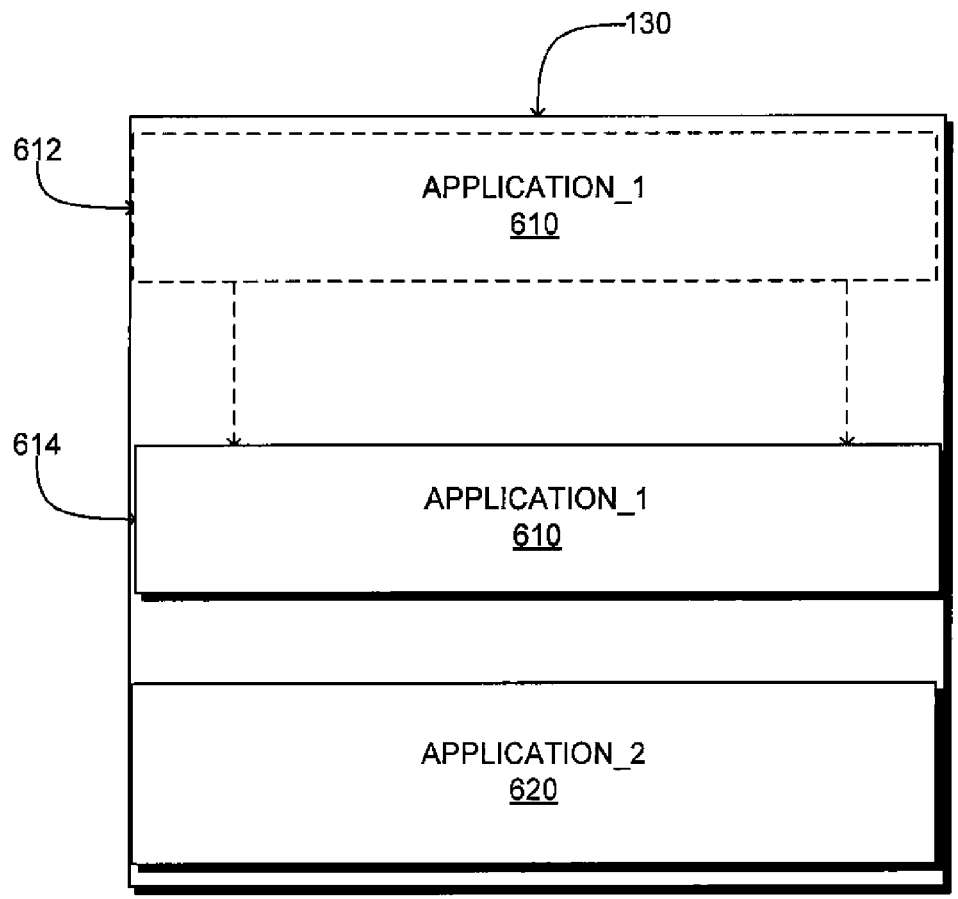
FIG. 6 illustrates one embodiment of window movement using a single-axis window manager.

FIG. 6 illustrates one embodiment of window movement using a single-axis window manager. For purposes of illustration, FIG. 6 shows two windows, 610 and 620 displayed on the screen 130. However, in other embodiments, the screen 130 displays more or fewer windows.

Upon receiving a move command, the display location on screen 130 of window 610 is changed from position 612 to position 614. In one embodiment, the move command causes allocation of a different region of the virtual display space to window 610. Although window 610 remains fixed relative to a first direction, it can be moved to any location along a second direction. For example, window 610 cannot be moved horizontally but can be moved vertically to any position; this movement along a single axis, such as the vertical axis, allows user settings or system processes to differently position windows within the virtual display space. For example, windows are moved to different positions within the virtual display space responsive to user input, allowing user customization of window display. Alternatively, system processes automatically move windows within the virtual display space responsive to system actions such as application launching, application closing, message receipt or similar use of mobile computing device resources. Hence, window 610 does not occupy a static region in the virtual display space, but occupies a variable region within the virtual display space depending on the receive commands, user settings or system settings. In one embodiment, a subset of windows occupies fixed regions in the virtual display space and cannot be moved. For example, windows associated with selected applications, such as system functions, may reside in fixed regions of the virtual display space, such as regions associated with the top or bottom of the screen 130, while windows associated with other applications can be freely moved within the virtual display space. In one embodiment, the applications residing in different regions of the virtual display space are displayed on screen 130 in different layers, so that applications in one region of the virtual display space are displayed over top of applications in another region of the virtual display space. This fixed location of a subset of windows is further described below in conjunction with FIG. 8.

Although FIG. 6 shows window 610 moving within the boundaries of the screen 130, responsive to receiving a move command, window 610 can be moved to a position in the virtual display space outside the screen 130 boundaries, which moves the window 610 outside of the visible screen 130 area. In one embodiment, user selection of an on-screen icon or menu moves window 610 from the screen 130 to a position in the virtual display space outside the screen 130. Alternatively, user input from the keyboard 150 and/or the navigation area 140 (e.g., a predetermined key sequence or button sequence) moves 610 window 610 out of the screen 130 area. Hence, a window 610 can be moved to different positions within the screen 130 and can also be moved to locations in the virtual display space outside of the visible screen 130 area In one embodiment, movement of window 610 results in corresponding movement of window 620. For example, as window 610 is moved, window 620 is similarly moved so that window 610 and window 620 remain in the same position relative to each other. This constrains free-form movement of windows and simplifies access to windows by preserving the relative position of windows. For example, if window 610 and window 620 are adjacent to each other, moving window 610 also moves window 620 so that window 610 and window 620 remain adjacent to each other.

Alternatively, movement of window 610 does not affect window 620. As shown in FIG. 6, window 620 remains in the same position even when window 610 is moved. By allowing individual movement of different windows 610 and 620, the screen 130 contents can be modified to suit individual user preferences, application settings or system configuration.

Figure 7:
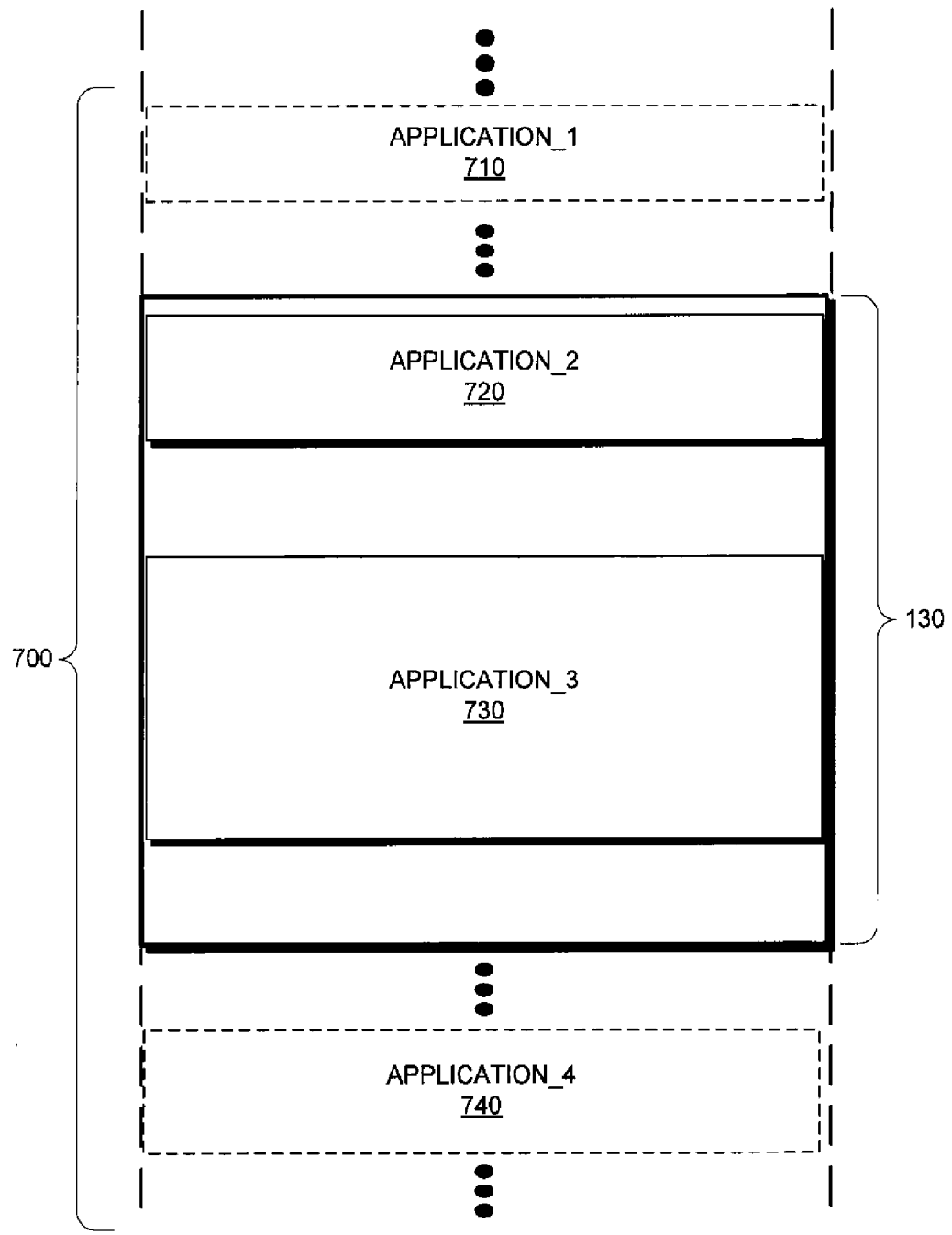
FIG. 7 illustrates one embodiment of a virtual display space for use in a single-axis window manager.

FIG. 7 illustrates one embodiment of a virtual display space for use in a single-axis window manager. The virtual display space 700 has a fixed dimension in a first direction, but extends indefinitely in a second direction. For example, the virtual display space 700 has a fixed horizontal dimension equal to the width of the screen 130, but extends indefinitely vertically. This allows an indefinite number of windows to be generated, rather than limiting the number of generated windows to those that can be displayed on screen 130. In various embodiments, windows are generated and inserted into various positions in the virtual display space. For example, newly generated windows are inserted into the virtual display space so they appear on the lower portion of screen 130 when displayed. Alternatively, newly generated windows are inserted into the virtual display space so they appear on the top portion of screen 130 or in the center portion of screen 130 when displayed. In another embodiment, generated windows are inserted into various locations within the virtual display space. It is noted, however, in one embodiment that the number of windows may be definite or predetermined, for example, depending on the amount of memory allocated for the virtual display space.

Responsive to receiving an input, windows within the virtual display space 700 but not within the screen 130 are displayed on the screen 130 while windows displayed on the screen 130 are moved from the screen 130 while remaining in the virtual display space 700. Essentially, the screen 130 acts as a window to the virtual display space 700, making a subset of the virtual display space 700 visible. Responsive to an input, the subset of the virtual display space 700 shown on the screen 130 is modified.

In the example of FIG. 7, window 720 and window 730 are displayed on screen 130, while window 710 and window 740 are within the virtual display space 700 but not displayed on screen 130. In one embodiment, a received input scrolls through the virtual display space 700 so different windows are displayed on screen 130. For example, scrolling through the virtual display space 700 removes window 720 from the screen 130 while displaying window 740 on the screen 130. Further, scrolling changes the position of window 730 by moving it towards the location previously occupied by window 720. As another example, a different scroll input causes window 720 and window 730 to be moved towards window 740 while displaying window 710 on the screen 130. Thus, in one embodiment, windows are scrolled in unison, so that windows currently displayed move in the same direction responsive to a scroll command. Hence, receiving a scroll command displays a different region of the virtual display space 700 on the screen 130, so that additional windows can be viewed without closing or resizing the currently displayed windows.

Figure 8:
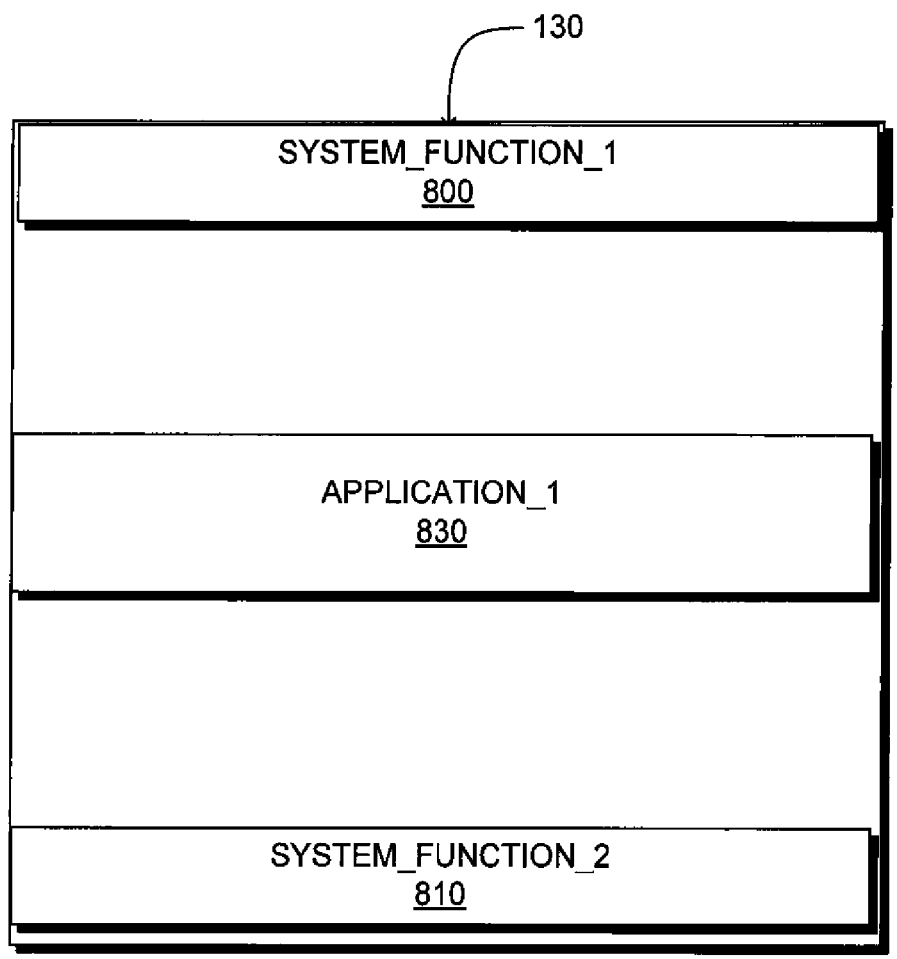
FIG. 8 illustrates one embodiment of predefined window locations in a single-axis window manager.

FIG. 8 illustrates one embodiment of predefined window locations in a single-axis window manager. In one embodiment, windows associated with certain applications occupy a specified region of the screen 130. This facilitates use of certain applications by consistently placing them in a predetermined location.

In one embodiment, windows associated with system-level applications are located in a specified, or predetermined, area of the screen 130. Examples of system-level applications comprise a application launcher, contacts database, notification application, keyguard, a volume control, a battery indicator, a signal strength indicator, a telephone application, or another application modifying or using system-level functions or characteristics of the mobile computing device 110. Alternatively, the system-level applications are specified by a user. For example, a user may specify a text editor, an e-mail client, a calendar and a web browser are system-level applications so that a window, or windows, associated with the system-level applications appear in a specific region of screen 130. In another embodiment, the system-level applications comprise a combination of user-selected applications and applications using system-level functions or characteristics. It is noted that in one embodiment, defined system-level applications may be selected through a menu that allows a user to select from a list of possible system-level application candidates.

In the example of FIG. 8, window 800 and window 810 are associated with system-level applications, so each window appears in a predetermined area of the screen 130. As window 830 is not associated with a system-level application, it may be moved within the screen 130. However, windows 800 and 810 remain in a specified location, providing consistent access to the system-level applications from the same location on the screen 130. In one embodiment, multiple windows 800, 810 are associated with different system-level applications so that different regions of the screen 130 can be used to access different system-level applications. For example, window 810 is associated with a signal strength indicator and a battery indicator, so those applications are persistently displayed in window 810. Window 800 is then associated with a different set of system-level applications, such as a status notifier or a telephone application, so that those applications consistently appear in a region of the screen 130 indicated by window 800.

Figure 9A:
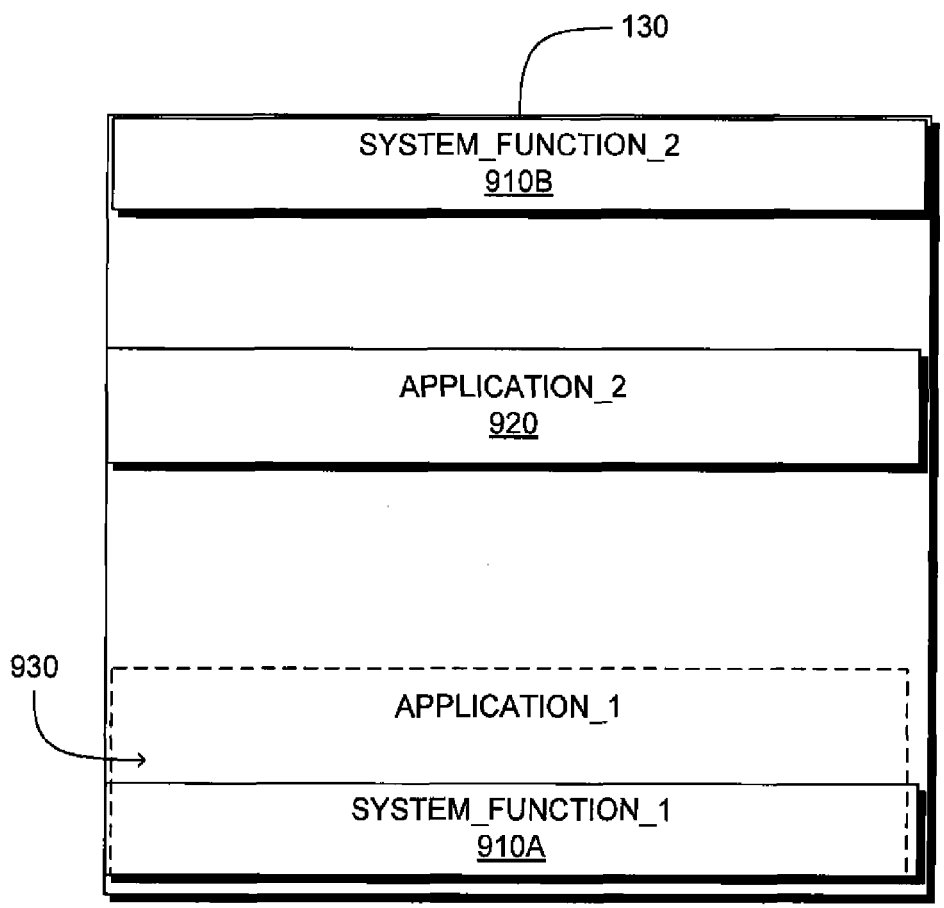
FIGS. 9A and 9B illustrate embodiments of window layering in a single-axis window manager.
Figure 9B:
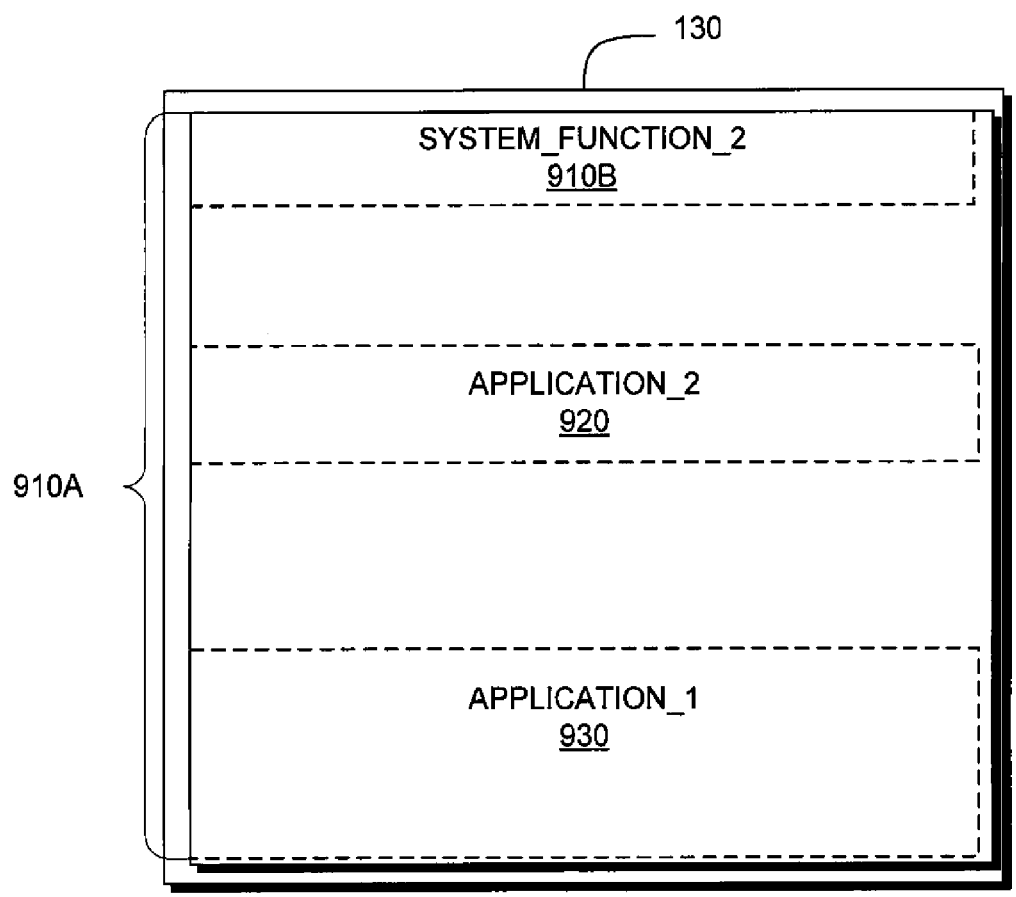

FIGS. 9A and 9B illustrate embodiments of window layering in a single-axis window manager. In an embodiment, one or more windows can overlap so that a first window partially obscures, or covers, a second window. This allows windows to be layered, so that one window is displayed over top of another window. In one embodiment, certain windows, such as those associated with system-level applications or user-specified windows, are configured to appear overtop of other windows. This allows windows to be prioritized so that certain content is preferentially displayed to a user and for allowing a user to transiently view and interact with certain system applications without affecting the layout and arrangement of existing application windows. For example, a user can access a pull down menu which temporarily obscures other application windows below the menu, but does not otherwise modify or affect the application windows so that when the menu is no longer accessed, the application windows are unchanged.

For example, in FIG. 9A window 910A and window 930 are layered. In one embodiment, window 910A is associated with a system-level function so it is configured to appear overtop of other windows. Hence window 910A obscures at least a portion of window 930, allowing uninterrupted access to the system-level function(s) associated with window 910A. However, because of the layering, a portion of window 930 remains visible as well as window 910A, also allowing access to the application associated with window 930.

FIG. 9B illustrates another embodiment of window layering by showing an example where window 910A is resized to substantially fully occupy screen 130. In one embodiment, because window 910A is associated with a system-level application, window 910A obscures other displayed windows. Hence, when window 910A fully occupies screen 130, window 930 and window 920, which are not associated with system-level applications, are completely obscured. In one embodiment, window 910A also completely obscures window 910B even though both are associated with system-level functions. Alternatively, window 910B is not obscured, and appears overtop of window 910A. In another embodiment, window 910B is changed in size to occupy the area of screen 130 not occupied by window 910A, essentially segmenting the screen into two regions for window 910A and window 910B. In one embodiment, a user specifies which windows associated with a system-level function will be displayed over other windows associated with a system level function. Alternatively, predefined rules specify which window associated with a system level function appears above another window associated with a system level function. For example, windows associated with system-level functions using system-level functions or characteristics appear over windows associated with user-defined system-level functions. In one embodiment, window 910A is associated with a launcher application so that when a user access the launcher application, window 910A is resized to substantially fill the screen 130.

Hence, the disclosed window manager allows multiple applications to be simultaneously visible on a mobile computing device screen. This allows a user to rapidly switch between applications as needed. The window manager also allows a user to reorder and/or resize various windows to suit a particular task or preference (e.g., simultaneously viewing an e-mail and a related chat message). Further, by loading windows into a virtual display space that is larger than the screen, applications that are not immediately required for use can still operate and be easily accessed without occupying part of the screen area. Also, the window manager allows regions of the screen to be associated with specific applications, allowing rapid access to those specific applications.

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality. The described operations and their associated modules may be embodied in software, firmware, hardware, or any combinations thereof.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for a single-axis window manager for use with a mobile communication device, or other devices having a limited display area through the disclosed principles herein. Thus, while particular embodiments and applications have been illustrated and described, it is to be understood that the present invention is not limited to the precise construction and components disclosed herein and that various modifications, changes and variations which will be apparent to those skilled in the art may be made in the arrangement, operation and details of the method and apparatus disclosed herein without departing from the spirit and scope as defined in the appended claims.

What is claimed is:

1. An operating method for a mobile device, the method comprising:
   determining whether to select a vertical dimension or a horizontal dimension as a fixed size in a first dimension, wherein a particular dimension is selected as the fixed size in the first dimension to minimize distortion of application content;
   inserting a plurality of windows into first locations in a virtual display space, each window of the plurality of windows having the fixed size in the first dimension, wherein each window of the plurality of windows is resizable in a second dimension that is perpendicular to the first dimension, and wherein resizing the window in the second dimension does not alter the fixed size in the first dimension;
   displaying at least a subset of the plurality of windows, the plurality of windows placed at the first locations of the virtual display space on a display device;
   displaying a fixed window within the virtual display space for display on the display device;
   responsive to receiving a first input, scrolling at least one of the plurality of windows other than the fixed window in a direction corresponding to the second dimension so that at least one different window is displayed on the display device; and
   displaying the fixed window overlaid on the scrolled window.

2. The method of claim 1, further comprising:
   responsive to receiving a second input, resizing at least one window of the plurality of windows in the second dimension.

3. The method of claim 1, wherein the first input is received from a navigation key on the mobile device.

4. The method of claim 1, wherein at least one window of the plurality of windows is associated with at least one system application.

5. The method of claim 4, wherein at least one window of the plurality of windows is associated with at least one general application.

6. A computer readable medium with stored instructions, the instructions when executed cause at least one processor to:
   determine whether to select a vertical dimension or a horizontal dimension as a fixed size in a first dimension, wherein a particular dimension is selected as the fixed size in the first dimension to minimize distortion of application content;
   insert a plurality of windows into first locations in virtual display space, each window of the plurality of windows having the fixed size in the first dimension, wherein each window of the plurality of windows is resizable in a second dimension that is perpendicular to the first dimension, and wherein resizing the window in the second dimension does not alter the fixed size in the first dimension;
   display at least a subset of the plurality of windows, the plurality of windows placed at the first locations of the virtual display space on a display device of a mobile device;
   display a fixed window within the virtual display space for display on the display device;
   responsive to receiving a first input, scroll at least one of the plurality of windows other than the fixed window in a direction corresponding to the second dimension so that at least one different window is displayed on the display device; and
   display the fixed window overlaid on the scrolled window.

7. The computer readable medium of claim 6, further comprising instructions that cause the processor to:
   responsive to receiving a second input, resize at least one window of the plurality of windows in the second dimension.

8. The computer readable medium of claim 6, wherein the first input is received from a navigation key on the mobile device.

9. The computer readable medium of claim 6, wherein at least one window of the plurality of windows is associated with at least one system application.

10. The computer readable medium of claim 9, wherein at least one window of the plurality of windows is associated with at least one general application.

11. A mobile computing device for executing a plurality of applications comprising:
    a window manager configured to:
      determine whether to select a vertical dimension or a horizontal dimension as a fixed size in a first dimension, wherein a particular dimension is selected as the fixed size in the first dimension to minimize distortion of application content;
      insert a plurality of windows into first locations in a virtual display space, each window of the plurality of windows having the fixed size in the first dimension, wherein each window of the plurality of windows is resizable in a second dimension that is perpendicular to the first dimension, and wherein resizing the window in the second dimension does not alter the fixed size in the first dimension; and
      responsive to receiving a first input, scroll at least one window of the plurality of windows in a direction corresponding to the second dimension so that at least one different window is displayed; and
    a computer device screen configured to:
      display at least a subset of the plurality of windows, the plurality of windows placed at the first locations of the virtual display space;
      display a fixed window within the virtual display space; and
      display the fixed window overlaid on the scrolled window.

12. The mobile computing device of claim 11, wherein responsive to receiving a second input, the window manager resizes a window in the second dimension.

13. The mobile computing device of claim 11, wherein the first input is received from a navigation key on the mobile computing device.

14. The mobile computing device of claim 11, wherein the window manager associates at least one window of the plurality of windows with a predefined region of the computing device screen.

15. The mobile computing device of claim 11, wherein responsive to receiving a second input, the window manager overlays a first window and a second window so that the first window obscures a portion of the second window.

16. The method of claim 1, wherein the fixed window obscures at least a portion of the at least one scrolled window.

17. The computer readable medium of claim 6, wherein the fixed window obscures at least a portion of the at least one scrolled window.

18. The mobile computing device of claim 11, wherein the fixed window obscures at least a portion of the at least one scrolled window.

19. The method of claim 1, wherein the method includes:
determining a vertical size of the display device and a horizontal size of the display device,
wherein, when the horizontal dimension is selected as the fixed size in the first dimension, the fixed size corresponds to the horizontal size of the display device, and wherein, when the vertical dimension is selected as the fixed size in the first dimension, the fixed size corresponds to the vertical size of the display device.

20. The computer readable medium of claim 6, wherein the instructions when executed cause the at least one processor to:
determine a vertical size of the display device and a horizontal size of the display device,
wherein, when the horizontal dimension is selected as the fixed size in the first dimension, the fixed size corresponds to the horizontal size of the display device, and wherein, when the vertical dimension is selected as the fixed size in the first dimension, the fixed size corresponds to the vertical size of the display device.

21. The mobile computing device of claim 11, wherein the window manager is configured to:
determining a vertical size of the computer device screen and a horizontal size of the computer device screen,
wherein, when the horizontal dimension is selected as the fixed size in the first dimension, the fixed size corresponds to the size of the horizontal dimension of the computer device screen, and wherein, when the vertical dimension is selected as the fixed size in the first dimension, the fixed size corresponds to the size of the vertical dimension of the computer device screen.

22. A mobile computing device comprising:
means for determining whether to select a vertical dimension or a horizontal dimension as a fixed size in a first dimension, wherein a particular dimension is selected as the fixed size in the first dimension to minimize distortion of application content;
means for inserting a plurality of windows into first locations in a virtual display space, each window of the plurality of windows having the fixed size in the first dimension, wherein each window of the plurality of windows is resizable in a second dimension that is perpendicular to the first dimension, and wherein resizing the window in the second dimension does not alter the fixed size in the first dimension;
means for displaying at least a subset of the plurality of windows, the plurality of windows placed at the first locations of the virtual display space on a display device;
means for displaying a fixed window within the virtual display space for display on the display device;
means, responsive to receiving a first input, for scrolling at least one of the plurality of windows other than the fixed window in a direction corresponding to the second dimension so that at least one different window is displayed on the display device; and
means for displaying the fixed window overlaid on the scrolled window.

23. The mobile computing device of claim 22, further comprising:
means, responsive to receiving a second input, for resizing a window in the second dimension.

24. The mobile computing device of claim 22, further comprising:
means for associating at least one window of the plurality of windows with a predefined region of the computing device screen.

25. The mobile computing device of claim 22, wherein the fixed window obscures at least a portion of the at least one scrolled window.

26. The mobile computing device of claim 22, further comprising:
means for determining a vertical size of the display device and a horizontal size of the display device, wherein, when the horizontal dimension is selected as the fixed size in the first dimension, the fixed size corresponds to the size of the horizontal dimension of the display device, and wherein, when the vertical dimension is selected as the fixed size in the first dimension, the fixed size corresponds to the size of the vertical dimension of the display device.

* * * * *